United States Patent
Westerberg et al.

(10) Patent No.: US 6,236,656 B1
(45) Date of Patent: May 22, 2001

(54) LINK-EFFICIENCY BASED SCHEDULING IN RADIO DATA COMMUNICATIONS SYSTEMS

(75) Inventors: Erik Westerberg, Hägersten (SE); Jan Forslöw, Menlo Park, CA (US)

(73) Assignee: Telefonaktiebolaget LM Ericsson (publ) (SE)

(*) Notice: Subject to any disclaimer, the term of this patent is extended or adjusted under 35 U.S.C. 154(b) by 0 days.

(21) Appl. No.: 09/044,357

(22) Filed: Mar. 19, 1998

(51) Int. Cl.[7] .................................................. H04L 12/54
(52) U.S. Cl. .......................... 370/395; 370/416; 455/452
(58) Field of Search ..................................... 370/395, 216, 370/429, 427, 470, 389, 517, 329, 337, 348, 349, 280, 416, 236, 347, 437, 460–462, 294, 401, 352; 379/114, 112; 455/406, 407, 452, 512–524, 38.1, 161.2, 166.2

(56) References Cited

U.S. PATENT DOCUMENTS

| | | | |
|---|---|---|---|
| 5,130,975 | * 7/1992 | Akata | 370/416 |
| 5,497,504 | 3/1996 | Acampora et al. | |
| 5,752,193 | * 5/1998 | Scholefield et al. | 370/329 |
| 5,844,885 | * 12/1998 | Grob et al. | 370/216 |
| 6,031,832 | * 2/2000 | Turina | 370/348 |

FOREIGN PATENT DOCUMENTS

| | | |
|---|---|---|
| 0 654 952 | 5/1995 | (EP). |
| 0 804 006 | 10/1997 | (EP). |
| WO 97 31501 | 8/1997 | (WO). |
| WO 97 33394 | 9/1997 | (WO). |
| 97 46035 | 12/1997 | (WO). |

OTHER PUBLICATIONS

Vucetic, J.: "A Hardware Implementation of Channel Allocation Algorithms Based on a Space–Bandwidth Model of a Cellular Network", IEEE Transactions on Vehicular Technology, vol. 42, No. 4, Nov. 1, 1993, pp. 444–454.

B. H. Yae, S. C. Lee, H. S. Kim: "A Scheduling Scheme for the Heterogenous Multimedia Services in Mobile Broadband Syst ems", Waves of the Year 2000+PIMRC '97; The 8th IEEE International Symposium on Personal, Indoor and Mobile Radio Communications, vol. 3, Sep. 1–4, 1997, pp. 1059–1063.

* cited by examiner

Primary Examiner—Wellington Chin
Assistant Examiner—Prenell Jones
(74) Attorney, Agent, or Firm—Jenkens & Gilchrist

(57) ABSTRACT

A system and method for scheduling packet transmissions, whereby a Base Station System (BSS) part provides scheduling-related information to a Switching System (SS) part for scheduling of LLC frames, which includes information about the total number of packet data service radio links in the cell, and for each user, the bandwidth per link. Consequently, the SS can determine the required link utilization and hence the transmission time for each data packet the SS submits for transmission over the radio links. As such, the SS can control all end-to-end QoS quantities for each data packet, and how these quantities are affected by the SS scheduling of the LLC frames to the BSS. In this way, the SS can completely control how QoS agreements with users are met.

30 Claims, 3 Drawing Sheets

|  | User 1 | User 2 | User 3 | User 4 |
|---|---|---|---|---|
| Load (size of IP-packet), L | 4.0 kbytes | 2.0 kbytes | 4.0 kbytes | 2.0 kbytes |
| Time to time-out, TO | 1.3 seconds | 1.2 seconds | 1.7 seconds | 2.2 seconds |
| Priority | 1 | 2 | 1 | 2 |
| Channel Throughput, T | 4 kbps | 5 kbps | 16 kbps | 8 kbps |
| Time needed to transfer the IP-packet over the radio interface | 2.0 seconds | 0.8 seconds | 0.5 seconds | 0.5 seconds |

LINK-EFFICIENCY BASED SCHEDULING IN RADIO DATA COMMUNICATIONS SYSTEMS

BACKGROUND OF THE INVENTION

1. Technical Field of the Invention

The present invention relates in general to the radio communications field and, in particular, to a system and method for scheduling data transfers in wireless data communications systems.

2. Description of Related Art

In the new generation of wireless data communication services, such as, for example, the General Packet Radio Service (GPRS) in the Global System for Mobile Communications (GSM), data packets are transferred from one application to another across a radio air interface. As such, the GPRS provides a means for transporting an application from a host transmitter to a receiver. In that regard, data packets (typically Internet Protocol or IP packets) are submitted to a GPRS at one access point, transported through the GPRS system, and ultimately delivered at a second GPRS access point.

In the GPRS Service Description, Stage 1 (Technical Specification GSM 02.60, version 5.1.0), a number of different Quality of Service (QoS) classes are described. Each such QoS class is further described by a set of service parameters. These QoS parameters include maximum delay, minimum mean throughput, priority, and level of reliability. Each service session (e.g., "Packet Data Processing or PDP context" in GPRS) subscribes to one QoS class. The end-to-end performance of the GPRS is of importance to an application. Consequently, all QoS parameters are defined from access point to access point.

As such, in accordance with the GPRS specification, QoS in a GPRS is measured between either the "R" or "S" and the "Gi" reference points. A GPRS is required to provide each service session with a bearer service that conforms to the QoS class agreed upon. Generally, this means scheduling the transmission of incoming data packets. Given a set of data packets with different QoS requirements, and different arrival times with respect to the GPRS system, a significant problem is to determine in what order these packets should be transmitted over different links in order to comply with the promised QoS requirements of the respective QoS classes. This scheduling problem is complicated by the fact that the throughput per link depends on the radio link conditions. Consequently, the throughput per radio link differs from user to user, and from one instant of time to another. This fact also implies that the total bandwidth on a link or in a cell depends on the user of the link, and therefore, on the scheduling of the packet transmissions.

Furthermore, a GPRS is divided into different subsystems, which adds to the complexity of the scheduling problem. Note, as mentioned earlier, that the QoS is measured end-to-end in a GPRS system, in addition to, for example, the QoS delay, and the sum of the delays in the Switching System (SS) part and Base Station System (BSS) part of the data communications system. More precisely, the QoS delay time is the sum of the queuing times in the Gateway GPRS Support Node (GGSN), Serving GPRS Support Node (SGSN), Packet Control Unit (PCU), the processing time, and the transmission time over all of the links. However, in a properly dimensioned GPRS system, the largest contributors to the overall delay are the queuing times and the transmission time over the radio air interface.

Existing algorithms place some scheduling functions in the SS part of the system (more specifically, in the Logical Link Control or LLC protocol layer), and some others in the BSS part (in the MAC/RLC protocol layer). The scheduling function in the SS concerns the order in which to submit LLC frames to the BSS. The SS scheduling function is accomplished by considering the data packet arrival times and the QoS parameters of the corresponding data flow. In addition, the SS scheduling function can consider some limited information about the data queues in the BSS, and estimated total bandwidth in each cell.

The scheduling function in the BSS determines in which order, and on which radio links, to transmit arriving LLC frames. In the BSS' scheduling function, the BSS can consider whatever information it has about the quality of the radio links, and the time at which the LLC frame was submitted to the BSS from the SS. In addition, the BSS can consider some very limited information about the relative importance of the LLC frames, which can be provided by the SS. For example, in the solutions for QoS and flow control presented in the GSM Technical Specifications 02.60 and 08.18 (BSS-SGSN; BSS GPRS Protocol, version 5.0.0), the SS information about the BSS' conditions is limited to the estimated total average bandwidth in each cell and restricted information about the length of the BSS queues, as carried in flow control messages.

The existing systems and scheduling techniques are incapable of implementing a workable QoS solution for a GPRS. In addition, the existing systems and scheduling techniques suffer from fundamental flaws, which can lead to excessive processor load, bad link-utilization, and poor throughput. The following examples illustrate these problems.

One problem is that the existing systems and scheduling techniques are unable to determine how well the QoS requirements imposed by subscribers are satisfied. Specifically, the BSS part of the system does not know the queuing time in the SS part. Consequently, the BSS is unable to determine the end-to-end delay. On the other hand, in at least the LLC "unacknowledge" mode of operation, the SS does not know the exact moment at which an LLC frame is transmitted over the radio air interface. Consequently, the SS is unable to determine the end-to-end delay. There is no information provided in a GPRS system about the end-to-end delay. Consequently, it is not possible to determine whether the GPRS bearer service meets the agreed upon delay requirements.

Another problem is that the existing systems and scheduling techniques are unable to control end-to-end delay times through a GPRS system. Specifically, the SS does not know the individual users' radio link conditions. As such, even if the SS had information about the lengths of the queues in the BSS, the SS still would not know how much time it would take to empty the BSS' queues. This problem occurs because the time it takes to transmit packets from the queues depends on the radio link conditions for each user having packets in the queues.

Furthermore, the SS typically does not know enough details about how the BSS' scheduling is accomplished. Consequently, the SS is unable to determine the amount of time a submitted LLC frame will spend in the BSS' queues before it is transmitted over the radio air interface. Therefore, similar to the BSS case, the SS is unable to control the GPRS' end-to-end packet delay.

Still another problem is that the existing systems and scheduling techniques are unable to deal with questions concerning the trade-offs between maximum bandwidth utilization and priority of users. Specifically, consider the situation wherein certain users having a high priority are suffering with poor radio link conditions, while other users having a low priority are enjoying high throughput per radio link. The system has to deal with the delicate task of choosing between the high throughput (low priority users) or providing resources to the high priority users. On the one hand, by providing all resources to the low priority, high link-throughput users, the system's overall throughput will be maximized. On the other hand, by providing all resources to the high priority users, the system will ensure that these users' high priority requirements are indeed realized. However, this prioritizing will be realized with the expense of poor throughput in the system. As such, situations such as these can be expected to occur frequently in any packet data radio system.

In existing data communications systems, the BSS knows too little about the QoS requirements to make appropriate scheduling decisions in the above-described situations. In contrast, the SS knows little or nothing about the throughput per user, and is similarly unaware of the above-described conflicts.

Yet another problem is that the existing systems and scheduling techniques lead to scheduling conflicts between the BSS and the SS. Specifically, with the information that the SS has available, it will typically schedule according to the QoS agreements and the arrival times of applications' data units. In contrast, the BSS is more likely to schedule according to the radio resources available, and the radio conditions that exist for the different users. In situations where these scheduling criteria are in conflict (e.g., as described above), the BSS' scheduling function is likely to contradict the intentions of the SS' scheduling function. Consequently, the result of these conflicts is poor QoS performance. As such, these conflicts are more likely to occur in systems where the BSS part and SS part of a system are provided by different manufacturers.

It follows then from the above-described problems that the existing systems and scheduling techniques are unable to efficiently provide subscribers with their requested QoS performance. Consequently, this shortcoming of the existing systems and scheduling techniques leads to poor performance for applications having stringent delay requirements, decreased throughput and thus, decreased capacity, due to applications (e.g., TCP/IP) that are unable to obtain the appropriate QoS. This problem induces retransmissions at the application level, and limited possibilities with respect to being able to offer low-cost/high-delay services. However, as described in detail below, the present invention successfully resolves these problems.

SUMMARY OF THE INVENTION

In accordance with a preferred embodiment of the present invention, a system and method are provided for scheduling packet transmissions whereby a BSS provides scheduling-related information to an SS for link-efficiency based scheduling of LLC frames, which includes information about the total number of GPRS radio links in the cell, and for each user, the bandwidth per link. Consequently, the SS can determine the required link utilization and hence the transmission time for each data packet the SS submits for transmission over the radio links. As such, the SS can control all end-to-end QoS quantities for each transmitted data packet, and just how these quantities are affected by the SS scheduling of the LLC frames for submission to the BSS. In this way, the SS can completely control how QoS agreements with users are met.

An important technical advantage of the present invention is that at the system level, QoS-related improvements are provided such as, for example, increased capacity, improved protection for applications having more stringent delay requirements, a greater possibility for offering low-cost/large-delay services, and more controlled differentiation between users.

A second important technical advantage of the present invention is that for a multi-protocol system structure, all scheduling intelligence is concentrated in one protocol (e.g., the LLC protocol in a GPRS system). As such, the risk of a conflict between scheduling algorithms in different protocol layers is minimized, which simplifies the system's design as well as the integration of nodes from different manufacturers.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

Figures 1, 2:
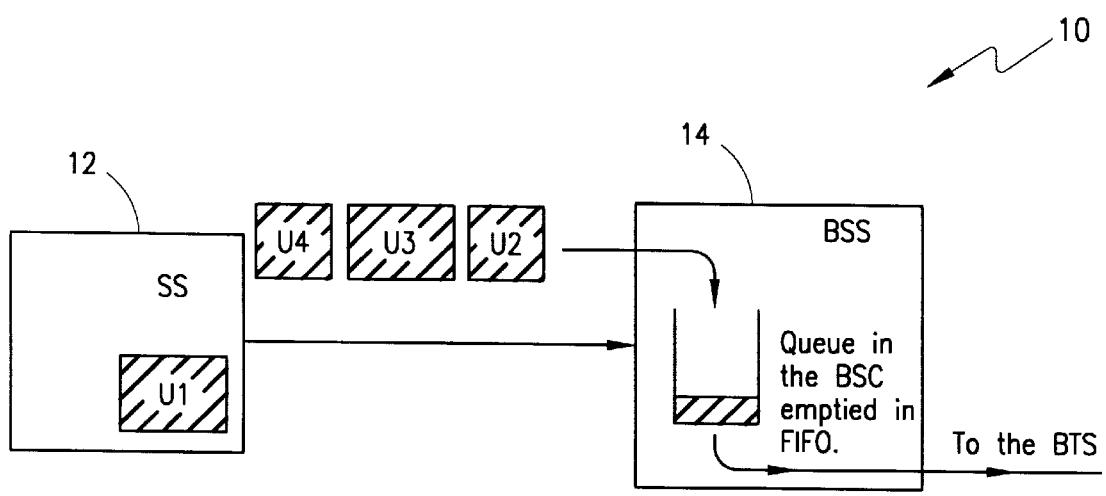
FIG. 1 is a Table that illustrates how a data communications system can obtain optimal scheduling of IP packet transmissions, in accordance with a preferred embodiment of the present invention.
FIG. 2 is a simplified block diagram that illustrates optimal scheduling of data units by an SS part of a radio data communications system utilizing link efficiency information provided by the BSS part, in accordance with a preferred embodiment of the present invention.

The preferred embodiment of the present invention and its advantages are best understood by referring to FIGS. 1–3B of the drawings, like numerals being used for like and corresponding parts of the various drawings.

Essentially, in accordance with a preferred embodiment of the present invention, a system and method for scheduling packet transmissions are provided whereby a BSS provides scheduling-related information to an SS for link-efficiency based scheduling of LLC frames, which includes information about (1) the total number of radio links in the cell, and (2) for each user, the bandwidth per link. Consequently, the SS can determine the required link utilization and hence the transmission time for each data packet the SS submits for transmission over the radio links. As such, the SS can control all end-to-end QoS quantities for each transmitted data packet, and just how these quantities are affected by the SS' scheduling of the LLC frames for submission to the BSS. In this way, the SS can completely control how QoS agreements with users are met.

Specifically, as described above, the bandwidth per link differs from user to user, because the radio link conditions vary from user to user. Notably, these variations are what makes high QoS performance so difficult to attain in a packet data radio system, such as a GPRS system. In accordance with the present invention, provided with access to the bandwidth per link for each user information, the SS can make the following determinations. First, the SS can determine that if it submits 2.4 kbytes of data for transmission to user A, and the SS knows from the bandwidth per link per user information that the link efficiency for user A is 1.6 kbytes/second/link, the transmission to user A will require resources corresponding to 1.5 seconds of link utilization. In the BSS, this link utilization time could be realized either by a 1.5 second transmission on one link, or a 0.75 second transmission on two links (assuming that user A's mobile station has a multi-slot capability).

In accordance with the present invention, the SS is provided with information about the total number of links in a cell. Consequently, the SS can calculate the total time it will take to transmit any combination of LLC frames the SS desires to submit to the BSS.

For a BSS that operates on a first-in-first-out basis, and with short queues in that BSS, the SS knows exactly the time interval between the submission of an LLC frame to the BSS and completion of the LLC frame's transmission over the radio air interface. An assumption can be made that the data processing delay time in the mobile station is small (the time it takes to assemble the LLC frames into application data units and forward the data units to an application). Consequently, with the use of the information about the total number of radio links in the cell, and the bandwidth per link for each user, for each combination of LLC frames that the SS submits to the BSS, the SS can calculate the end-to-end time each application data unit will spend in the packet data radio system. With this elapsed time information, and information about the QoS agreements made with the various users, the SS can schedule the submission of LLC frames to the BSS in a manner that will best fulfill the agreed upon QoS requirements. In accordance with the present invention, this advantageous method can be applied for any packet data radio system.

In a GPRS system, the BSS has information about retransmissions, codings used, interference, and other radio link-related quantities. Consequently, the BSS can utilize this information in order to pass on to the SS the information about the bandwidth per link per user. One way to estimate the bandwidth per link for a user is to make a measurement (e.g., using knowledge about the coding and the fraction of radio blocks that are retransmitted). For a new user in the system, or for a user whose measurement results are considered too old to still be valid, a cell average can be used until more reliable measurement results can be obtained. In a GPRS system, the total number of radio links in a cell is simply the number of Basic Physical Channels currently allocated to the GPRS. In accordance with the present invention, the BSS communicates this information to the SS.

In an operating data communications system, the precision of the estimate for information about the bandwidth per link for each user depends on the particular method used. Since any such estimate will include uncertainties, obviously the bandwidth information will not be precise. Consequently, the load submitted by the SS to the BSS can utilize slightly less or slightly more resources than those anticipated by the SS. This uncertainty leads to a problem with fluctuating length queues in the BSS. However, these fluctuations can be controlled in a number of ways. For example, the BSS can report biased values for the bandwidth per link for each user. As such, by having the BSS report slightly smaller values than what are measured, the SS can be "fooled" into submitting data at a lower rate, which reduces the queue lengths in the cell. Similarly, the queue lengths in the cell can be increased by having the BSS report to the SS slightly larger bandwidths than what are measured. Another method to control the queues is to let the BSS report to the SS information about the length of the queue in each cell.

FIG. 1 is a Table that illustrates how a data communications system can obtain optimal scheduling of IP packet transmissions, in accordance with a preferred embodiment of the present invention. It should be understood that although the following description of an exemplary embodiment is applied to a GPRS system, the invention is not intended to be so limited, and can include scheduling in any packet data wireless system such as, for example, a Cellular Digital Packet Data (CDPD) System, GPRS in a GSM or Digital-Advanced Mobile Phone System (D-AMPS), packet data service in an IS-95 system, packet data radio satellite communications systems, and developing broadband systems such as Wideband-Code Division Multiple Access (W-CDMA) systems. Also, the specific details (e.g., number of users, number of channels, delay requirements, times of arrival, throughput per user, parameters and parameter values used, etc.) can differ from the exemplary description.

Referring to the Table shown in FIG. 1, the following scenario can be considered. In the SS involved, there are data units (e.g., IP packets) to be scheduled for transmission for four different users (data units denoted as U1, U2, etc. for respective users 1, 2, etc.). Each of these data units has its own time interval for a time-out (TO), and each user has a relative priority (e.g., priority 1 is the highest user priority, and priority 2 is the lowest user priority). For this illustrative embodiment, the data communications system is attempting to implement the following scheduling strategy: (1) Attempt to satisfy as many priority 1 QoS agreements as possible; and (2) While respecting the constraints imposed by strategy (1), try to satisfy as many priority 2 QoS agreements as possible. As such, for the purposes of this illustration, "satisfying a QoS agreement" means to deliver an IP packet before a respective TO occurs.

For this illustrative embodiment, assume that the number of GPRS channels in the cell is 4, and all users' mobile stations have a four-slot capability (i.e., each user's mobile station can use up to four channels simultaneously). Also assume that the users' mobile stations are operating in different radio environments (e.g., each mobile station typically uses different error protection coding and retransmission rates). Consequently, each user's mobile station has a unique throughput (T) per radio link (as illustrated in the Table shown in FIG. 1).

Further assume for this exemplary embodiment that the queue of data units (Q) that are already stored in the BSS part will take 0.2 seconds to empty, by transmitting the data units to the respective users' mobile stations. Moreover, no specific scheduling algorithm is presupposed, because the optimal scheduling method according to the present invention does not have to be linked with any particular scheduling algorithm.

FIG. 2 is a simplified block diagram that illustrates optimal scheduling of data units by an SS part of a radio data communications system (10) utilizing link efficiency information provided by the BSS part, in accordance with a preferred embodiment of the present invention. First, the SS 12 calculates the time it should take to transmit each user's data load (e.g., size of the IP packet) if the respective user has complete access to all four channels. This time interval (shown in FIG. 1) is $t=L/nT$, where L is each user's data load (e.g., size of the IP packet), T is the channel throughput, and n is the number of channels used (n=4 for this example). As illustrated by FIG. 1, even if user 1 could immediately access all available channels, the QoS agreement with user 1 would not be satisfied. Furthermore, scheduling so that user 1's data is submitted first implies that no other user would have its QoS agreement satisfied, because by the time user 1's data transmission is completed (after 2.0 seconds), the other three users' IP packet submissions also would have timed out. For this scenario, once the SS 12 determines that user 1's submission and transmission cannot be completed successfully, then the SS 12 attempts to schedule the remaining users' submissions (e.g., U2, U3, U4) so that these users will have their QoS agreements satisfied.

System 10 can accomplish this optimal scheduling by first transmitting (first-in-first-out via the BSS part 14 and the Base Transceiver Station or BTS) the respective IP packet to user 2, then the respective IP packet to user 3, and then the respective IP packet to user 4, as illustrated by FIG. 2. With the above-described scheduling arrangement, and a queue length in the BSS 14 that corresponds to 0.2 seconds of transfer time, these transfers of the U2, U3 and U4 IP packets are accomplished at t=1.0s, t=1.5s, and t=2.0s, respectively.

Figure 3A:
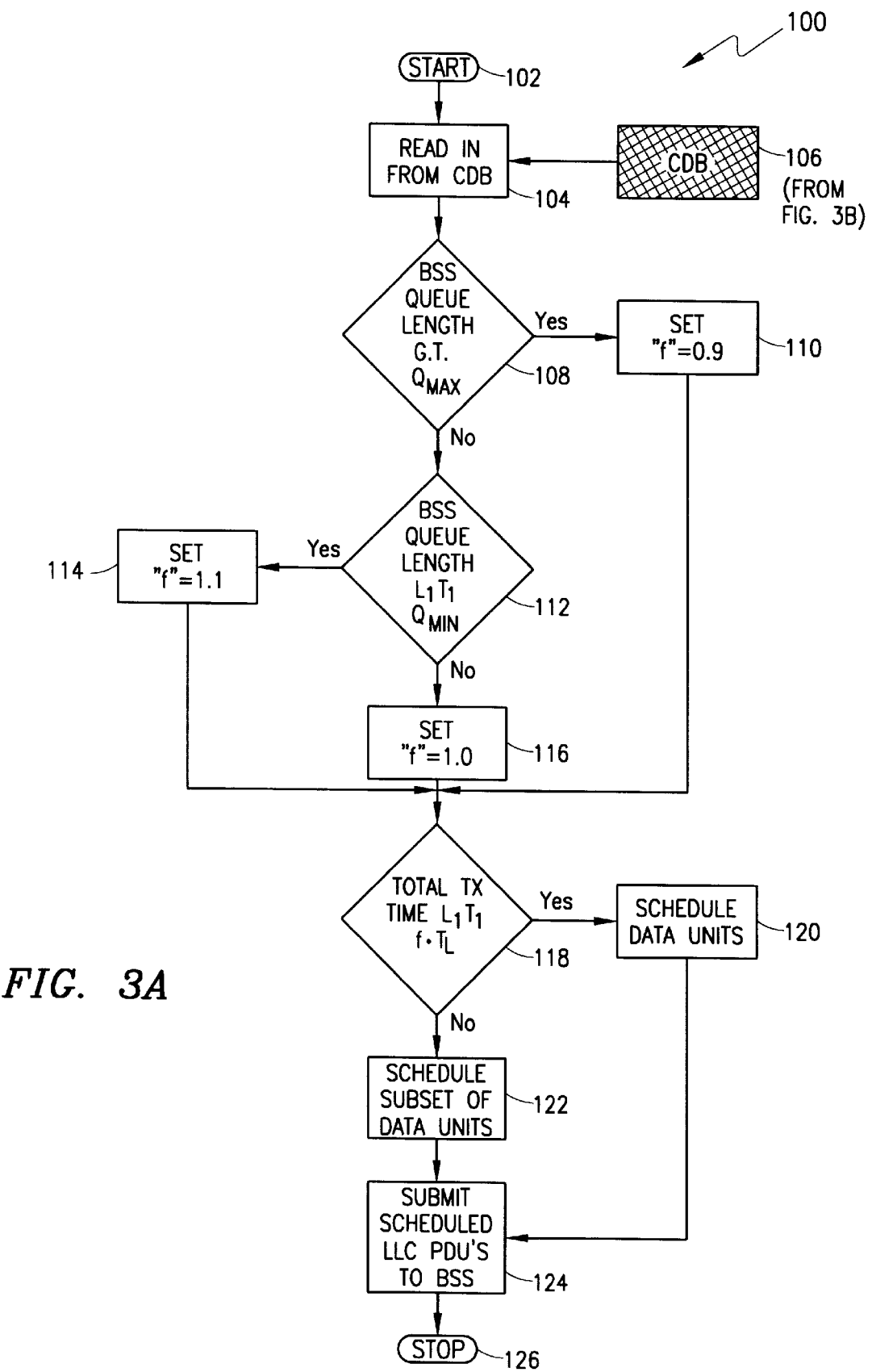
FIG. 3A is a flow diagram that illustrates how link-efficiency based scheduling can be implemented in an SS part of a data radio communications system, in accordance with the preferred embodiment of the present invention.
Figure 3B:
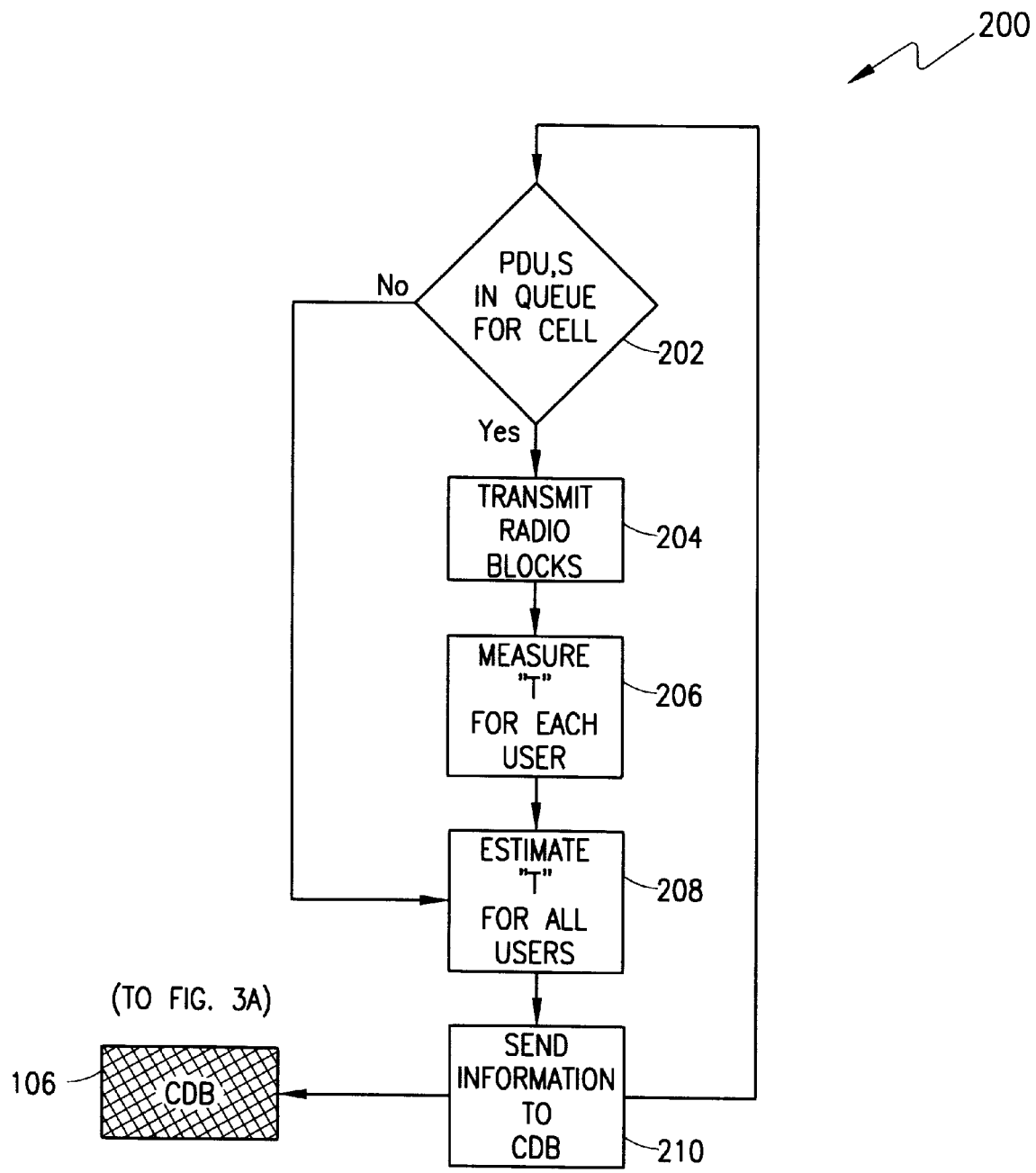
FIG. 3B is a flow diagram that illustrates how link-efficiency based scheduling can be implemented in a BSS part of a data radio communications system, in accordance with the preferred embodiment of the present invention.

FIGS. 3A and 3B are related flow diagrams that illustrate how link-efficiency based scheduling can be implemented, in accordance with the preferred embodiment of the present invention. Referring to FIGS. 2 and 3A (for the SS part), the present exemplary method shown begins by considering what data will be transferred to users during the next $T_L$=1.5 seconds. From system data, the SS 12 knows that the number of channels (n) is equal to 4, the queue length (Q) is equal to 0.2 seconds, and the throughput per user is as shown in the Table of FIG. 1. Assume that $Q_{max}$=220 ms, where $Q_{max}$ is the value of Q at which the SS 12 begins to decrease the queue length, by submitting a reduced load to the cell involved. Also assume that $Q_{min}$=180 mS, where $Q_{min}$ is the value of Q at which the SS begins to increase the queue length, by submitting an increased load to the cell involved.

For this embodiment, the steps in the method 100 are completed periodically with a time period of $T_L$, where $T_L$ is the loop time for the method (i.e., the steps are performed once every $T_L$ period). A reasonable value for $T_L$ is between 50 ms and 2.0 seconds. The exemplary SS method begins at step 104, where the SS 12 reads the following link efficiency-related information from the cell-data basis (CDB) 106 (for the cell being considered): (1) for each user in the cell, T, or the throughput per link for the user (i.e., the throughput a user would have if using the full capacity of one radio link in the cell); (2) the total number of radio links in the cell; and (3) the length of the BSS queue (Q) in the cell. The CDB 106 is communicated from the BSS 14 by a conventional method, as described in detail below.

At step 108, the SS 12 determines whether the BSS queue length in the cell is larger than the $Q_{max}$ value. If so, at step 110, the SS sets the parameter, f (compensation factor), equal to 0.9. If not, at step 112, the SS 12 determines whether the BSS queue length in the cell is smaller than the $Q_{min}$ value. If so, at step 114, the SS 12 sets the parameter, f, equal to 1.1. Otherwise, at step 116, the SS sets the parameter, f, equal to 1.0.

At step 116, the SS determines whether the total transmission time for all of the data units stored in the SS, which are addressed to users in the cell involved, is smaller than the value, $f*T_L$. If so, at step 120, considering the information from the CDB 106, the QoS agreements of the users, and the GPRS arrival times of the data units from step 118, the SS 12 schedules all of the data units from step 118 in a way that maximizes the number of QoS agreements fulfilled.

Otherwise, at step 122, considering the information in the CDB 106, the QoS agreements of the users, and the GPRS arrival times of the data units from step 118, the SS 12 selects and schedules a subset of the data units from step 118 in a way that maximizes the number of QoS agreements fulfilled. At this point, the SS 12 has access to all of the information shown in FIG. 1. Using the above-described reasoning, or by explicitly considering the outcome of the 4!=24 possible schedulings, the SS 12 can deduce that the optimal scheduling is as described directly above. Consequently, the SS 12 can schedule itself to submit first the 2 kbyte IP packet to user 2, then the 4 kbyte IP packet to user 3, and then the 1.2 kbyte IP packet to user 4. This scheduling results in a total of 7.2 kbytes of data, which according to the information shown in FIG. 1, takes 1.5 seconds to transmit over the radio air interface. As such, at step 124, the SS submits the scheduled LCC packet data units (PDUs) to the BSS 14 for transmission to the respective users via the BTS (not shown).

The above-described method for the SS part (12) provides that at every period, $T_L$, the SS submits a load (LLC PDUs) to the BSS 14 for further delivery to the users' mobile stations, which is described below with respect to FIG. 3B. In accordance with the present invention, considering the link efficiency for each user, and the total number of radio links in a cell, the amount of load the SS 12 submits to the BSS 14 is the SS's estimate of what can possibly be transmitted during a time period, $T_L$, (steps 120, 122). In order to guard against too lengthy queues of data units in the BSS 14 due to imprecise estimates made by the SS 12, the SS 12 checks for long queues, and adjusts the load to decrease such queues if necessary (steps 108, 110). The SS 12 takes similar steps where it determines that there are too short queues of data units to be submitted to the BSS 14, by adjusting the load to increase such queues if necessary (steps 112, 114).

Referring to FIGS. 2 and 3B for the exemplary BSS part of the present invention, the BSS 14 implements the following steps preferably in a continuous loop, and thereby regularly updates the CDB 106 for use by the SS 12. As such, the exemplary method (200) begins at step 202, wherein the BSS 14 determines whether there are any data units (PDUS) in the queue for the cell involved. If so, at step 204, the BSS 14 transmits (via the BTS) a set of radio blocks belonging to one or more LCC PDUs. At step 206, for each active user in step 204, the BSS 14 measures the throughput per radio link, T (using a conventional measurement technique).

Returning to step 202, if the BSS 14 determines there are no data units in the queue for the cell involved, then the method proceeds directly to step 208. At step 210, as described above with respect to the SS method 100, the BSS 14 conveys the pertinent link-efficiency-related information to the CDB 106 (to be sent periodically to the SS 12). The information includes (for the cell being considered) for each user in the cell, T, which is the throughput per link for the user (i.e., the throughput a user would have if using the full capacity of one radio link in the cell), the total number of radio links in the cell, and the length of the BSS queue (Q) in the cell.

As such, for this exemplary embodiment, in the BSS 14, the data is transmitted on a first-in-first-out basis. After having transmitted the 0.2 seconds worth of data already queued in the BSS 14, the BSS 14 continues to use all four channels to transmit the respective data to user 2 (U2) When this transmission has been completed (i.e., at t=1.0s), the BSS 14 next transmits the respective data to user 3 (U3), and then transmits the respective data to user 4 (U4). During these transfers of data, the BSS 14 measures the actual throughput (given by the numbers of retransmissions and the coding used), and then updates the CDB 106 according to step 210 in FIG. 3B.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. In a wireless data communications system comprising a switching system, a base station and a plurality of individual user stations, wherein radio links extend from said user stations to said base station and said base station is disposed to selectively enable data transmissions over respective radio links, a method for scheduling said data transmissions comprising the steps of:

coupling specified information characterizing the efficiency of each of said links from said base station to said switching system; and operating said switching system to submit a sequence of data units to said base station for transmission over respective radio links, each of said data units corresponding to one of said user stations, and said sequence being selectively ordered in response to said link efficiency information so that the transmission of each data unit fulfills a quality of service agreement of the user station corresponding thereto.

2. The method of claim 1, wherein: said coupling step comprises coupling information to said switching system which comprises the total number of said radio links and, for each of said users, the bandwidth for each of said links.

3. The method of claim 1, wherein said switching system schedules said submitting of said sequence of said data units so as to maximize the number of said quality of service agreements which are fulfilled.

4. The method of claim 1, wherein said data units comprise packet data units.

5. The method of claim 1, wherein said wireless data communications system comprises a GPRS system, and said data units comprise IP packets.

6. The method of claim 1, wherein said data units comprise LLC packet data units.

7. The method of claim 1, wherein said wireless data communications system comprises a packet data wireless system.

8. The method of claim 1, wherein said wireless data communications system comprises a CDPD system.

9. The method of claim 1, wherein said wireless data communications system comprises a packet data service associated with an IS-95 system.

10. The method of claim 1, wherein said wireless data communications system comprises a packet data radio satellite communications system.

11. The method of claim 1, wherein said wireless data communications system is associated with a W-CDMA system.

12. The method of claim 1, wherein said wireless data communications system is a system associated with a wireless Asynchronous Transfer Mode (ATM) system.

13. The method of claim 1, wherein said links are included in a common cell.

14. A method for scheduling data transmissions in a wireless communications system, comprising the steps of:
a switching system reading in cell-based link efficiency information from a base station system;
determining whether a data queue length in said base station system is greater than a first predetermined value or less than a second predetermined value;
adjusting a load to compensate for at least one condition wherein said data queue length is greater than said first predetermined value or less than said second predetermined value;
sequencing an intended submission of data units for transmission so as to maximize a number of quality of service agreements to be fulfilled; and
submitting said sequence of said data units to said base station system.

15. The method of claim 14, further comprising the steps of:
said base station system determining whether said data queue includes at least one data unit;
if so, emptying said queue by data transmission;
measuring a throughput per link per user; and
compiling and conveying to said switching system said cell-based link efficiency information, including at least one value for said measured throughput per link per user, for a total number of links, and for a length of said queue.

16. The method of claim 15, further comprising the step of said base station system transmitting said data units to a plurality of users on a first-in-first-out basis.

17. The method of claim 14 or 15, wherein said cell-based link efficiency information includes a total number of links in a cell.

18. In a wireless communications system provided with a plurality of user stations, a system for scheduling data transmissions comprising:
a base station disposed to generate specified information characterizing the efficiency of each of a plurality of radio links extending from said user stations to said base station; and
a switching system disposed to receive said link efficiency information and operable to submit a sequence of selectively ordered data units to said base station for transmission over respective radio links, each of said data units corresponding to one of said user stations, said switching system being further operable to order said sequence in response to said link efficiency information so that the transmission of each data unit fulfills a quality of service agreement associated with its corresponding user station.

19. The system of claim 18, said base station system further operable to:
store said sequence of said data units in a queue; and
output for transmission said sequence of said data units from said queue on a first-in-first-out basis.

20. The system of claim 18, wherein said switching system is further operable to schedule submission of said sequence of said data units so as to maximize the number of said quality of service agreements, which are fulfilled.

21. The system of claim 18, wherein said data units comprise packet data units.

22. The system of claim 18, wherein said wireless data communications system comprises a GPRS system, and said data units comprise IP packets.

23. The system of claim 18, wherein said data units comprise LLC packet data units.

24. The system of claim 18, wherein said wireless data communications system comprises a packet data wireless system.

25. The system of claim 18, wherein said wireless data communications system comprises a CDPD system.

26. The system of claim 18, wherein said wireless data communications system comprises a packet data service associated with an IS-95 system.

27. The system of claim 18, wherein said wireless data communications system comprises a packet data radio satellite communications system.

28. The system of claim 18, wherein said wireless data communications system is associated with a W-CDMA system.

29. The system of claim 18, wherein said wireless data communications system is a system associated with a wireless ATM system.

30. The system of claim 18, wherein said links are included in a common cell.

* * * * *